United States Patent [19]

Greco

[11] Patent Number: 4,781,487

[45] Date of Patent: Nov. 1, 1988

[54] QUICK DISCONNECT COUPLING

[75] Inventor: Stephen P. Greco, East Islip, N.Y.

[73] Assignee: Scientific Industries, Inc., Bohemia, N.Y.

[21] Appl. No.: 52,112

[22] Filed: May 4, 1987

Related U.S. Application Data

[63] Continuation of Ser. No. 753,410, Jul. 10, 1985, abandoned.

[51] Int. Cl.$^4$ .................... B25G 3/18; F16B 21/00
[52] U.S. Cl. .................... 403/326; 403/383; 285/321
[58] Field of Search .............. 403/361, 383, 326, 356, 403/357; 279/1 B, 1 Q, 76, 77, 78, 79, 80, 89, 90; 285/321

[56] References Cited

U.S. PATENT DOCUMENTS

| | | | |
|---|---|---|---|
| 2,558,589 | 6/1951 | Skolfield | 464/89 |
| 2,638,761 | 5/1953 | Henry | 464/89 |
| 2,644,475 | 7/1953 | Morton | 403/326 X |
| 2,817,502 | 12/1957 | Yohe | 366/251 |
| 3,182,345 | 5/1965 | Smith . | |
| 3,315,537 | 4/1967 | Keller . | |
| 3,347,293 | 10/1967 | Clark . | |
| 3,462,147 | 8/1969 | Mancuso | 403/343 X |
| 3,468,553 | 9/1969 | Ashby et al. | 279/1 Q |
| 3,611,748 | 10/1971 | Wallgren . | |
| 3,655,226 | 4/1972 | Cowan . | |
| 4,006,996 | 2/1977 | Kasabian | 279/1 B |
| 4,079,917 | 3/1978 | Popeil | 366/244 |
| 4,385,854 | 3/1983 | Miyakawa | 279/1 Q |

FOREIGN PATENT DOCUMENTS

| | | | |
|---|---|---|---|
| 832373 | 7/1952 | Fed. Rep. of Germany | 279/89 |
| 543733 | 3/1942 | United Kingdom | 279/1 Q |

Primary Examiner—Andrew V. Kundrat
Attorney, Agent, or Firm—Ostrolenk, Faber, Gerb & Soffen

[57] ABSTRACT

A coupling which includes an inner and outer part is used to connect two coupled members. The inner part has a cylindrical outer wall and the outer part has a recess around which is a cylindrical inner wall, the recess fitting over the inner part so that the outer wall faces the inner wall. A gliding groove in one wall faces an annular locking member on the other wall, and the annular locking member fits into the groove to lock the inner and outer parts in the mounted position. The gliding groove is shaped to glide over the annular locking member during mounting and dismounting. To prevent the inner and outer part from rotating relative to each other, a key on one part fits into a keyway in the other part. The two parts may be connected by applying a slight compressive force so that the gliding groove glides over the annular locking means into the mounted position. Similarly, a slight tensile force may be applied for dismounting. One of the parts may be made of a hard material, while the other part is made of a softer material which will absorb damage in case of impact between the two parts.

16 Claims, 1 Drawing Sheet

U.S. Patent  Nov. 1, 1988  4,781,487
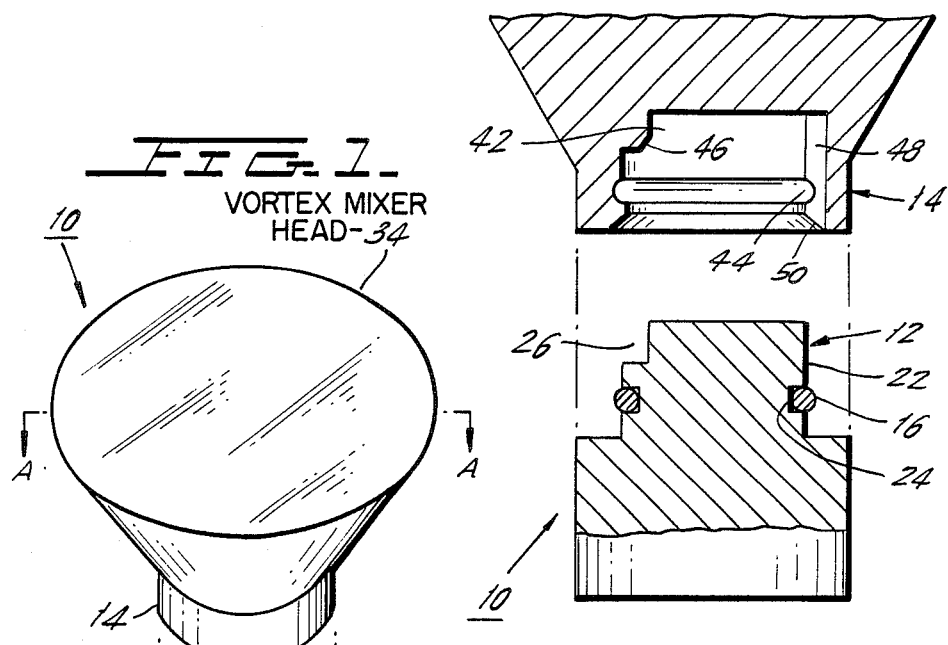
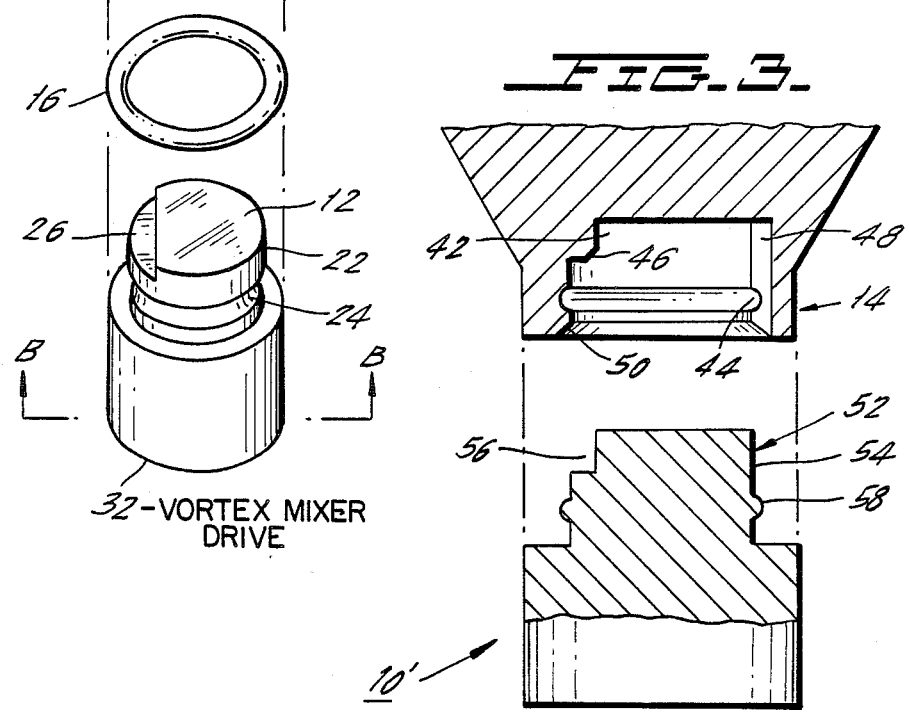

QUICK DISCONNECT COUPLING

This is a continuation of Application Ser. No. 753,410 filed on July 10, 1985 and now abandoned.

BACKGROUND OF THE INVENTION

The present invention relates to a coupling for transmitting rotary motion. More specifically, the present invention relates to such a coupling which may be quickly disconnected and reconnected by a manual operation.

Numerous forms of couplings for transmitting rotary motion are known. Common types of couplings used to join two shafts at adjacent ends include bellows couplings, sleeve couplings, flexible couplings, oldham couplings, wafer spring couplings and universal lateral couplings. If such a coupling is used to transmit a rotary motion, especially at relatively high rpm or with a high speed reciprocating motion, the ends of the shafts are held together by bolts, set screws, clamps, roll pins or rivets, to ensure that the two parts are held tightly together and that the rotary force is transmitted. These various means for holding the shafts together, however, make it necessary to use a tool such as a wrench to assemble and disassemble the coupling.

U.S. Pat. No. 3,611,748 discusses one technique for providing a coupling which may be more easily connected and disconnected. In this coupling, a spring loaded ball is used. Other similar couplings use spring clips, fast threaded devices, interference fits and similar means to allow connection and disconnection. Such means, however, are not suitable for high speed reciprocating motion and cannot withstand the accompanying vibrations.

In some applications, it is desirable to have a coupling for high speed reciprocating rotary motion which can be quickly disconnected and reconnected manually without the use of a tool. For example, it may be desired to drive any of several implements using a single driving unit. One example is small laboratory mixers and shakers such as the Vortex Genie TM Vortex Mixer manufactured by Scientific Industries, Inc., the assignee of the present invention. The drive unit of such a mixer may be used with any of several mixing heads, and the mixing head is a structure which holds one or more liquid containing vessels such as test tubes, beakers, flasks and so forth on the drive shaft of the mixer. These heads, which may be designed to hold a specific type of liquid containing vessel, have conventionally been marketed either as dedicated parts integral with the mixer or as add-on attachments which must be attached with a tool to a mixer drive. It is often desirable, however, to interchange heads on the mixer, and this is impossible if the head is integral with the mixer and is difficult if a tool is required to make the change from one head to another.

It would be advantageous to have a quickly disconnectable and reconnectable coupling which could be used to transmit high speed reciprocating rotary motion in a device such as a laboratory mixer. It would further be advantageous if this coupling were structured to damp and withstand torsional vibrations and provide a positive lock between the two coupled parts.

SUMMARY OF THE INVENTION

The present invention provides a coupling which may be quickly disconnected and reconnected manually, without the use of tools, and which also withstands the torsional vibration accompanying high speed reciprocating rotary motion, provides viscous damping and prevents relative rotation between the coupled members.

The present invention also provides a coupling which may be used on a device such as a laboratory mixer to permit the easy disconnection and reconnection of a driven structure such as a mixer head to a driving structure such as a mixer drive. The coupling according to the present invention may be quickly disconnected by applying a slight tensile force and may be reconnected by applying a slight compressive force.

A coupling according to the present invention has an inner part connected to one of the coupled members and an outer part connected to the other. The outer part has a recess defined in it for fitting over the inner part. The wall of one of the parts has an annular gliding groove defined in it which locks with an annular locking member on the wall of the other part when the inner and outer parts are in their mounted position. Rotation preventing means such as a key and keyway are provided for preventing relative rotation between the inner and outer parts in the mounted position. As a result, the inner and outer parts are rotatable together about an axis central to both of their respective walls. The locking member may be a compressible O-ring held in an annular holding groove facing the gliding groove and shaped to hold the O-ring and to permit the O-ring to expand into the holding groove during mounting and dismounting. The gliding groove is shaped for gliding over the locking member during mounting and dismounting. The holding groove may be a rectangular groove, and the gliding groove may be a curved groove with a radius of curvature larger than the radius of the O-ring cross-section, which is circular. The gliding groove and holding groove may also be shaped so that a compressive force is maintained on the O-ring in the mounted position, and this may be done by providing grooves shaped so that the spacing between the innermost point of the inner groove and the outermost point of the outer groove is less than the diameter of the O-ring cross-section.

The locking means may alternatively be an annular convexity on the wall of one of the parts, over which the gliding groove will glide for mounting and dismounting. The annular convexity may be integral with the part on which it is formed, and both parts may be formed of suitable materials. For example, the annular convexity may be integral with a relatively hard plastic inner part while the gliding groove is defined in a relatively soft outer part which will stretch as necessary to permit mounting and dismounting over the annular convexity. Alternatively, both parts may be of equal stiffness, but sufficiently stretchable and compressible to permit mounting and dismounting. In either case, the annular convexity and the gliding groove may be shaped so that they maintain a force against each other in the mounted position.

The key and the keyway may be positioned so that the coupling is assembled by fitting the outer part over the inner part, then rotating the inner and outer parts relative to each other to align the key and keyway, and then moving the inner and outer coupling parts into the mounted position. The key may be on the inner wall of the outer part, with the keyway defined in the outer wall of the inner part.

The inner part may be connected to a stationary driving member, such as a mixer, while the outer part is connected to a removable driven member such as one of several mixing heads. The inner part may be relatively hard, with the outer part relatively soft, so that the inner part will remain undamaged by contact with the outer part as a result of the process of removing the outer part and replacing it with one of the other mixing heads. Furthermore, the annular convexity or holding groove with O-ring may be on the hard inner part for use with each of the mixing heads.

The coupling according to the invention thus provides for quick manual disconnection and reconnection. Furthermore, the coupling according to the invention will withstand the torsional vibration due to high speed reciprocating rotary motion, provide viscous damping and prevent relative rotation between the members being coupled.

Other objects, features and advantages of the invention will be apparent from the following description, together with the accompanying drawings and the appended claims.

BRIEF DESCRIPTION OF THE DRAWINGS

FIG. 1 is an exploded perspective view of one embodiment of the coupling according to the invention.

FIG. 2 is an exploded cross-sectional view of the coupling of FIG. 1 taken along the lines A—A and B—B.

FIG. 3 is an exploded cross-sectional view of another embodiment of the coupling according to the invention, taken along the same lines as FIG. 2.

DETAILED DESCRIPTION OF THE PREFERRED EMBODIMENTS

FIG. 1 shows coupling 10 with three parts according to one embodiment of the present invention. Inner coupling part 12 fits into a recess in outer part 14. Between inner part 12 and outer part 14 is O-ring 16 which, as discussed below, serves to lock inner part 12 and outer part 14 in a mounted position in such a way that they can be easily disconnected and reconnected as desired. FIG. 1 also shows in perspective some of the features of inner part 12. As seen in FIG. 1, inner part 12 has a generally cylindrical outer wall 22, in which is defined an outward groove 24 and a keyway 26, which may take any appropriate shape.

FIG. 1 also shows inner part 12 connected to a first coupled member 32, while outer part 14 is connected to a second coupled member 34. The first coupled member 32 may be a driving shaft extending upward from a mixer, while the second coupled member 34 may be a driven mixing head for holding a number of vessels such as test tubes, beakers, flasks and so forth. FIG. 2 shows in greater detail the structure of inner part 12. In particular, holding groove 24 is shown as rectangular, a shape which holds O-ring on inner part 12, yet permits O-ring 16 to expand into holding groove 24 when it is compressed during mounting or dismounting.

Outer part 14, as shown in FIG. 2, similarly has a generally cylindrical inner wall 42 in which is defined a gliding groove 44 which, like holding groove 24, fits over O-ring 16 in the mounted position. Key 46, on the inner wall 42, is complementary to the shape of keyway 26, and is positioned so that when gliding groove 44 and holding groove 24 are facing each other, key 46 fits into keyway 26, preventing relative rotation between inner part 12 and outer part 14. Outer part 14 also has an air relief slit 48 defined in it to permit the movement of air during mounting and dismounting. The O-ring used in coupling 10 may be a conventional O-ring as used in other types of mounting arrangements.

The assembly of coupling 10 may be understood from FIGS. 1 and 2. The O-ring 16 is expanded over the inner part 12 and fitted into holding groove 24. The outer part 14 is then placed with its recess over the inner part 12 and rotated until the key 46 is aligned with keyway 26, which can be felt manually because the outer part 14 will tend to slip down onto the inner part 12 when the key and keyway are properly aligned. A slight additional compressive force will cause the O-ring 16 to be compressed by the inner wall 42 of outer part 14. For this purpose, the inner wall 42 may have a bevel 50 defined at its open end, as shown in FIG. 2. O-ring 16 will compress into rectangular holding groove 24, allowing the outer part 14 to slide past it, until O-ring 16 expands into gliding groove 44, locking inner part 12 and outer part 14 in the mounted position.

Gliding groove 44 must be shaped to glide over O-ring 16 during the mounting and dismounting of coupling 10. O-ring 16 preferably has a circular cross-section, and gliding groove 44 has a curved shape in cross-section, with its radius of cuvature being greater than the radius of the cross-section of O-ring 16. In addition, the outermost point of gliding groove 44 may be spaced apart from the innermost point of holding groove 24 such that a slight compressive force is exerted on O-ring 16 in the mounting position, increasing the surface area over which O-ring 16 contacts inner part 12 and outer part 14 and enabling O-ring 16 to act as a shock absorber providing viscous damping, helping to eliminate torsional vibration due to high speed reciprocal rotating motion and also preventing noise due to chafing between the inner part 12 and outer part 14 or due to other reasons. Also, gliding groove 44 should be shaped so that it has no sharp edges which will cut into O-ring 16 during repeated mounting and dismounting.

If properly rounded, gliding groove 44 will permit dismounting when a slight tensile force is applied to outer part 14, pulling it away from inner part 12. The tensile force required, however, is sufficient that outer part 14 will be stable in the mounted position throughout operation.

The inner part 12 and outer part 14 may be made of plastic in order to provide smooth and quiet operation and to optimize wear characteristics. Similarly, the O-ring should be made of a material with an appropriate durometer rating to provide the desired locking and unlocking characteristics in order to obtain a satisfactory mounting. Since inner part 12, in the embodiment shown in FIGS. 1 and 2, is mounted on a stationary driving member such as a mixer drive, it is difficult to replace and should be protected as much as possible from the danger of damage. Outer part 14, on the other hand, is mounted on a replaceable member such as a mixing head, and therefore can be more easily replaced. Therefore, inner part 12 can be made from a hard material, while outer part 14 is made from a relatively soft material. If outer part 14 and inner part 12 come into contact due to faulty operation or due to other causes, inner part 12 will not be damaged, while outer part 14 will absorb the impact and may perhaps be damaged. In this manner, outer part 14 may be replaced if necessary and the replacement of inner part 12 may be avoided.

FIG. 3 shows an alternative embodiment in which coupling 10' includes only two parts, inner coupling part 52 and outer coupling part 14. Although outer coupling part 14 may be the same as outer coupling part 14 in FIGS. 1 and 2, inner coupling part 52 has the annular locking member formed integrally with its outer wall 54 as an annular convexity 58. As in FIGS. 1 and 2, key 46 fits into keyway 56 and outer coupling part 14 may then be moved onto inner coupling part 52 until gliding groove 44 locks with convexity 58. The parts must be sufficiently flexible to permit mounting and dismounting. Outer coupling part 14 may be relatively soft and more flexible, or both parts may be of equal flexibility, but sufficiently stretchable or compressible to permit mounting and dismounting. The radius of curvature of gliding groove 44 should be greater than that of convexity 58 and the two should be shaped to maintain a force against each other in the mounted position. As in FIGS. 1 and 2, a slight compressive force should be necessary for mounting and a slight tensile force for dismounting.

The coupling according to the invention allows fast and easy exchange of the mixing heads of a vortex mixer, for example, as described above. No additional tools are required, and no additional steps such as loosening screws, with the attendant danger of damage to the coupling, must be performed. The coupling itself, however, withstands torsional vibration and provides viscous damping even for high speed reciprocating rotating motion. The coupling is also lightweight. It also prevents relative rotation between the members being connected.

The coupling of the invention could be made in a number of ways, with the annular locking member on either the inner or outer coupling part and the gliding groove on the other. Similarly, either the inner or outer part may be mounted to a stationary driving member with the other part being connected to a removable driven member.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A coupling for connecting a rotatable driving member to a rotatable driven member, comprising:
    a first coupling part for connecting to the rotatable driving member;
    a second coupling part for connecting to the rotatable driven member, one of the first and second coupling parts having a recess defined therein for removably fitting over the other of the first and second coupling parts in a mounted position; the first and second coupling parts each having a respective wall which face each other when the first and second coupling parts are in the mounted position;
    means for preventing relative rotation between the first and second coupling parts when in the mounted position so that the first and second coupling parts are rotatable together;
    locking means for holding the first and second coupling parts in the mounted position and for permitting mounting and dismounting of the second coupling part from the first coupling part;
    the locking means comprising an annular locking member on the respective wall of the first coupling part and an annular gliding groove defined in the respective wall of the second coupling part; the locking member being held in the gliding groove in the mounted position; the gliding groove being shaped for gliding over the locking member during mounting and dismounting;
    the annular locking member and the annular gliding groove each have a respective radius of curvature, the radius of curvature of the gliding groove being greater than the radius of curvature of the annular locking member; and
    the first coupling part being relatively hard and the second coupling part being relatively soft so that the second coupling part is undamaged by mounting and dismounting onto the first coupling part.

2. The coupling of claim 1 in which the locking member is an O-ring, the O-ring being compressible for permitting the first and second coupling parts to be mounted and dismounted; the first coupling part having an annular holding groove defined in its wall, the holding groove being shaped for holding the O-ring and for permitting the O-ring to expand into the holding groove during mounting and dismounting.

3. The coupling of claim 2 in which the holding groove is a rectangular groove.

4. The coupling of claim 2 in which the O-ring has a circular cross-section.

5. The coupling of claim 2 in which the gliding groove and the holding groove are further shaped for maintaining a compressive force on the O-ring in the mounted position.

6. The coupling of claim 5 in which the O-ring has a circular cross-section, and in which an inner one of the grooves has an innermost point and an outer one of the grooves has an outermost point, the gliding groove and holding groove being shaped so that the innermost point and the outermost point are spaced by less than the diameter of the O-ring cross-section in the mounted position for maintaining the compressive force on the O-ring.

7. The coupling of claim 1 in which the annular locking member is an annular convexity on the respective wall of the first coupling part.

8. The coupling of claim 7 in which the first coupling part with the annular convexity is an inner coupling part and the second coupling part with the annular gliding groove is an outer coupling part with the recess defined therein for fitting over the inner coupling part.

9. The coupling of claim 7 in which the annular convexity and the gliding groove are shaped for maintaining a force against each other in the mounted position.

10. The coupling of claim 7 in which the annular convexity is integral with the first coupling part.

11. The coupling of claim 1 in which the rotation preventing means comprises a key on one of the first and second coupling parts and a keyway defined in the other of the first and second coupling parts, the key being in the keyway in the mounted position.

12. The coupling of claim 11 in which the key and keyway are positioned so that the coupling may be assembled by fitting one of the first and second coupling parts over the other coupling part, by then rotating the first and second coupling parts relative to each other to align the key and keyway and by then moving the first and second coupling parts into the mounted position.

13. The coupling of claim 11 in which the key is on the respective wall of the coupling part which has the recess defined therein, the keyway being defined in the respective wall of the other coupling part.

14. The coupling of claim 1 in which the first coupling part with the annular locking member is an inner coupling part and the second coupling part with the gliding groove defined therein is an outer coupling part with the recesses defined therein for fitting over the inner coupling part.

15. The coupling of claim 1 in which the driving member is a vortex mixer drive and the driven member is one of a plurality of vortex mixing heads usable with the vortex mixer drive, the dismounting of the second coupling part from the first coupling part permitting replacement of the one mixing head by another of the mixing heads.

16. The coupling member of claim 1 in which the driving member is a vortex mixer drive and the driven member is a vortex mixing head for holding a vessel for mixing purposes

* * * * *